United States Patent [19]

Leame

[11] Patent Number: 5,372,165
[45] Date of Patent: Dec. 13, 1994

[54] PROCESS AND DEVICE FOR PRODUCING A WAVE WINDING, ESPECIALLY FOR ROTARY CURRENT GENERATORS

[75] Inventor: Filippo Leame, Schöneck, Germany

[73] Assignee: Statomat Specialmaschinen GmbH, Niederdorfelden, Germany

[21] Appl. No.: 77,612

[22] Filed: Jun. 17, 1993

[30] Foreign Application Priority Data

Dec. 30, 1992 [DE] Germany ............... 4244488

[51] Int. Cl.$^5$ .............................................. B21F 3/00
[52] U.S. Cl. .................................................. 140/92.1
[58] Field of Search ....................................... 140/92.1

[56] References Cited

U.S. PATENT DOCUMENTS

| | | | |
|---|---|---|---|
| 3,872,897 | 3/1975 | Droll et al. | 140/92.1 |
| 4,357,968 | 11/1982 | Kieffer | 140/92.1 |
| 4,739,807 | 4/1988 | Walker . | |

FOREIGN PATENT DOCUMENTS

| | | |
|---|---|---|
| 0209091 | 1/1987 | European Pat. Off. . |
| 0226550 | 6/1987 | European Pat. Off. . |
| 2406612 | 8/1974 | Germany . |
| 2921114 | 12/1980 | Germany . |
| 3120885 | 12/1982 | Germany . |
| 3343390 | 10/1985 | Germany . |
| 3522086 | 1/1987 | Germany . |
| 56-53936 | 12/1981 | Japan . |

Primary Examiner—Lowell A. Larson
Attorney, Agent, or Firm—Larson and Taylor

[57] ABSTRACT

A method and device for producing a wave winding includes a stationary template which has a specific number of radially projecting arms corresponding to a specific number of waves desired on the wave winding. A winding nozzle through which a wire is fed is revolved by a revolving device along a winding path about the template. A respective forming element located between adjacent ones of the arms of the template and external to the winding path includes a wire engaging end adjacent the winding path. A moving device moves respective wire engaging ends of the forming elements to engage the winding wire and to push the winding wire inward between respective sequential adjacent arms of the template during each revolution of the winding nozzle about the template. Preferably, the winding wire is pushed to a position immediately adjacent flanks of the adjacent arms and this occurs by moving of the respective forming element radially inward when the revolving winding nozzle is located between the respective forming element and a following one of the two adjacent arms between which the winding wire is pushed. If desired each successive winding can be stripped off from the template by use of a transfer tool.

11 Claims, 4 Drawing Sheets

PROCESS AND DEVICE FOR PRODUCING A WAVE WINDING, ESPECIALLY FOR ROTARY CURRENT GENERATORS

The invention relates to a process for producing a wave winding, especially for rotary current generators, by establishing a specific number of concentric wave-shaped windings using a winding nozzle that revolves relative to a stationary winding holder, as well as a device for performing this process. Such processes and devices are used preferably in the production of stators for motor vehicle dynamos.

In the case of simple, undistributed wave windings, each phase has a single wave-shaped winding, whereby all wire sections extending through a particular groove of the stator lamination bundle are bent at the latter's frontal faces into the same peripheral direction, i.e. in the form of a single strand, towards the next retaining groove (see DE 29 21 114 A1, FIG. 1, and EP 0 226 550 B1). This results in an uneven distribution of the wire in the end turns that project beyond the frontal faces of the stator. Here the relatively strong winding strands cross each other and prevent a high space factor. Cooling also is uneven. Because of this, as a rule a so-called distributed or double-layer wave winding in which the wire sections in one groove of the stator lamination bundle are bent on each frontal face of the stator partially into one and partially into the other peripheral direction (see DE 29 21 114 A1, FIG. 2).

In automated production processes, wave windings can be inserted either directly, winding by winding, into the grooves of a stator lamination bundle, whereby the winding nozzle is guided longitudinally to the grooves, or they can be prewound and then be pulled into the stator lamination bundle using a pulling tool. The first process is relatively slow, the latter can be faster, but so far has various other disadvantages that depend on the particular implementation version. If the wave winding is essentially prewound in a circular manner, for instance according to DE 23 51 952 B2 or DE 31 20 885 A1, and is then formed into a star- or wave-shaped cross-section and pulled in, it is certainly possible to produce double-layer wave windings, but the two layers cannot be wound next to each other without interrupting the wire. Instead they must be connected to each other by a so-called switching connection after the pulling in, during which process the situation shown in DE 35 22 086 O2 results. The same disadvantage occurs if a coil is wound according to DE 33 43 390 C2 onto an internal form and is then formed by radially inserted, external forming elements into a star or wave shape, because the large difference in cross-section between a prewound coil that has already been formed and the coil that is wound afterwards would result in a long wire connection.

A process for obtaining a double-layer wave winding without wire interruption is described in EP 0 209 091 B1. According to this process, first a wave winding with the number of windings of both layers is produced and is then divided, turned, and off-set along the periphery. The enumeration of the different consecutive work steps alone shows that the process is very complicated if it is supposed to be performed automatically.

And finally, DE 24 06 612 B2 already introduced a process for making a wave winding by pushing the winding wire from a winding nozzle and placing it winding by winding in wave shape into a winding holder that is constructed of a number of rods by guiding the winding nozzle along a wave-shaped peripheral path. With this process it is difficult to produce an accurately defined form of the winding, since it is supported only loosely at few points. The winding process also takes very long.

The invention therefore is based on the task of creating a process of the initially described type and a device suitable for performing this process, permitting with a short cycle time the production both of single-layer wave windings and double-layer wave windings without wire interruption.

This task is solved according to the invention in that the winding wire is wound by a winding nozzle that revolves on a revolving path onto a template inside the revolving path, this template having a specific number of radially projecting arms, and that the winding wire is pushed radially inward between the arms by external forming elements during the winding movement.

The invention has the advantage that the winding nozzle is able to revolve relatively fast on a revolving path, while the wire that is wound on the template is pulled from the winding nozzle by itself so that no feeding of the wire is required. The wire receives the intended wave shape of the winding—with great accuracy—already during the production of a single winding between template and the external forming elements. During the production of a double-layer wave winding, the latter's first layer has the same cross-section after being stripped from the template as the layer that is wound immediately following it with reversed rotary direction, so that both layers can be wound consecutively without wire interruption and be stripped off the template into a transfer tool that for this purpose performs a rotary switching movement between accepting the first and second layer.

A device for performing the new process has a winding nozzle that can be driven in a revolving manner relative to a stationary winding holder and is characterized in that the winding holder is a template constructed with radially projecting arms and that external forming elements are provided that can be inserted radially between the arms of the template during the winding process. With this device it is possible to exploit the advantage that the winding with a revolving winding nozzle onto a stationary template and the stripping off of the wire windings or the winding off the template into a transfer tool in the form of transfer tongs or a pulling-in tool is a tested method in the winding of stator lamination bundles with simple round or oval coils. The device of the invention differs from this in function essentially only by the radially insertable external forming elements.

A frequent requirement for winding devices requires that changes to a different bundle height of the stator lamination bundle can be performed quickly and simply. For this purpose, a preferred design of the invention suggests that the radial length of the arms of the template is adjustable. This is the only measure required for adjusting the new winding device to a different bundle height.

Other preferred design characteristics are apparent from the following description of an embodiment based on the enclosed drawings. Herein:

Figure 3:
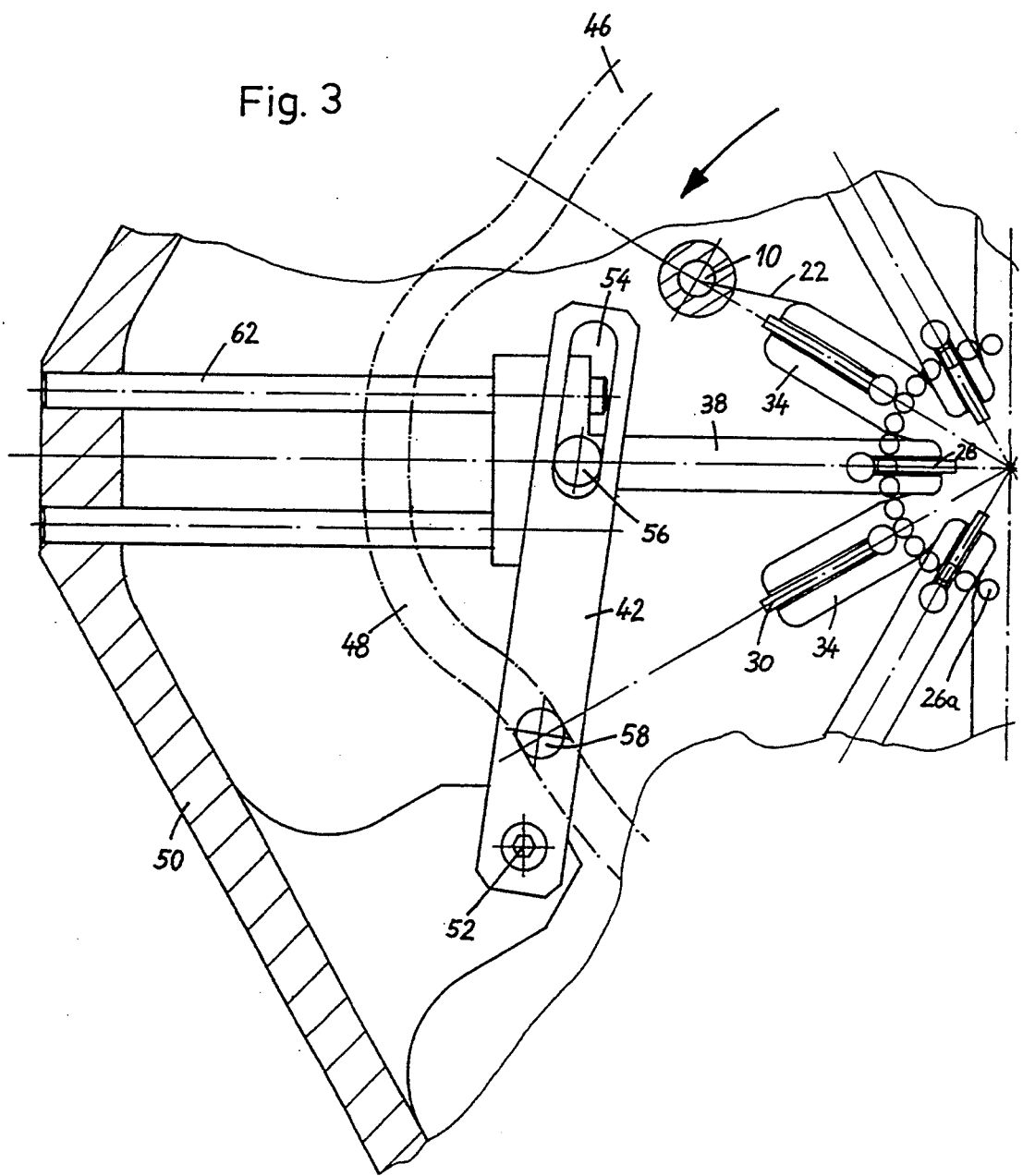
FIG. 3 shows an excerpt of FIG. 2 on a larger scale.
Figure 4:
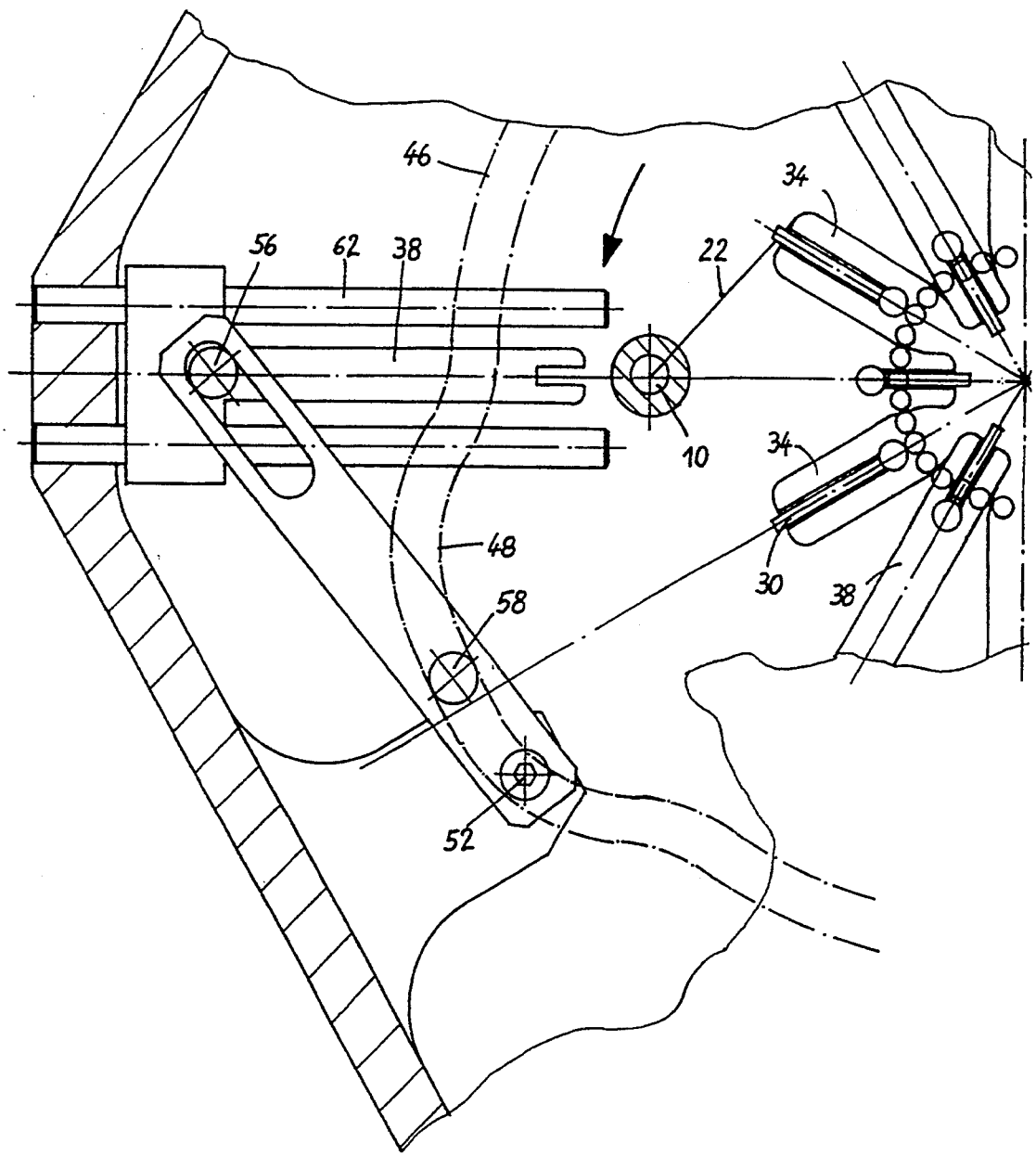

FIG. 4 in a view corresponding to FIG. 3, shows the parts of the device in a different position.

Figure 1:
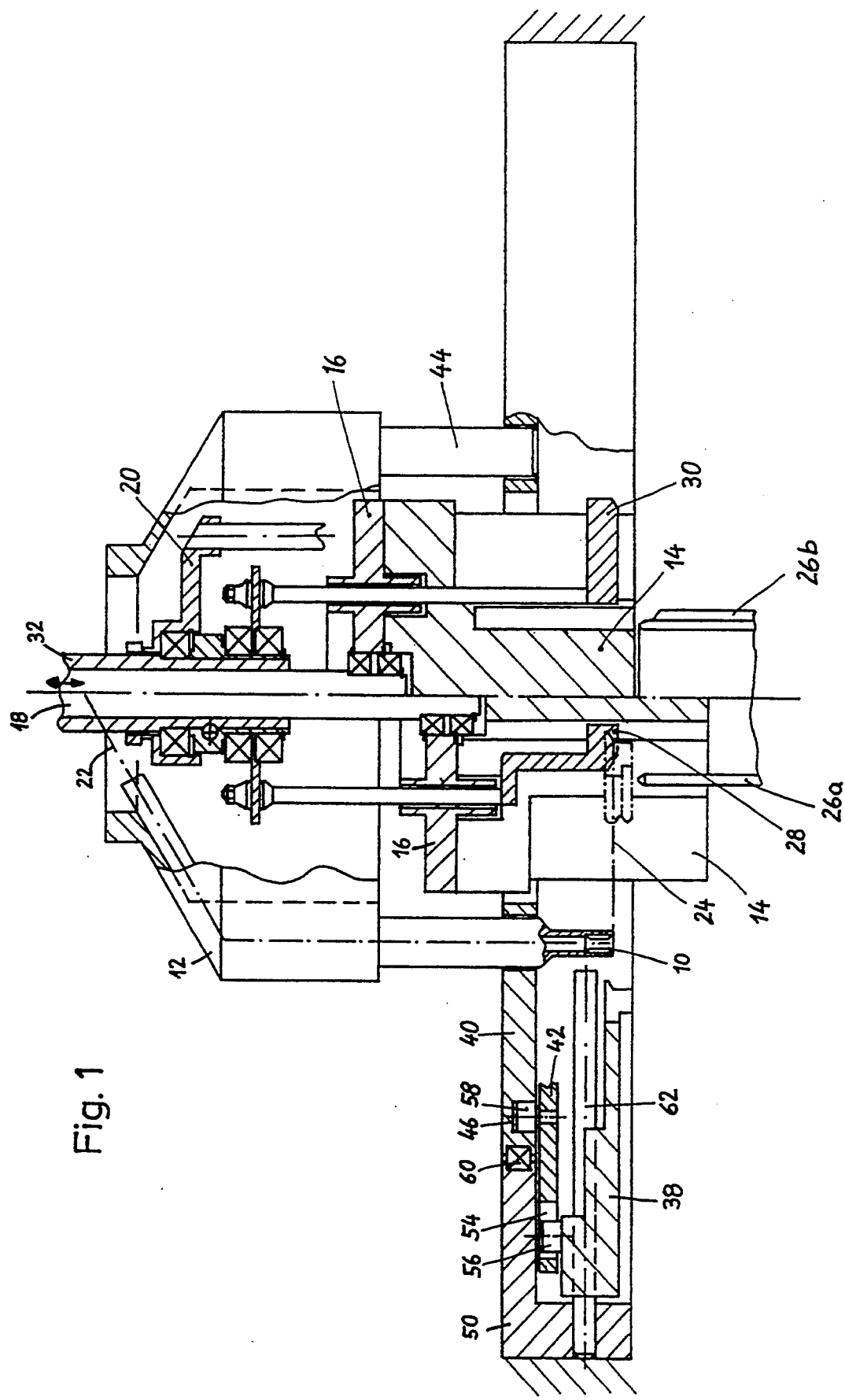
FIG. 1 shows a simplified vertical cross-section through a winding device for producing wave windings.
Figure 2:
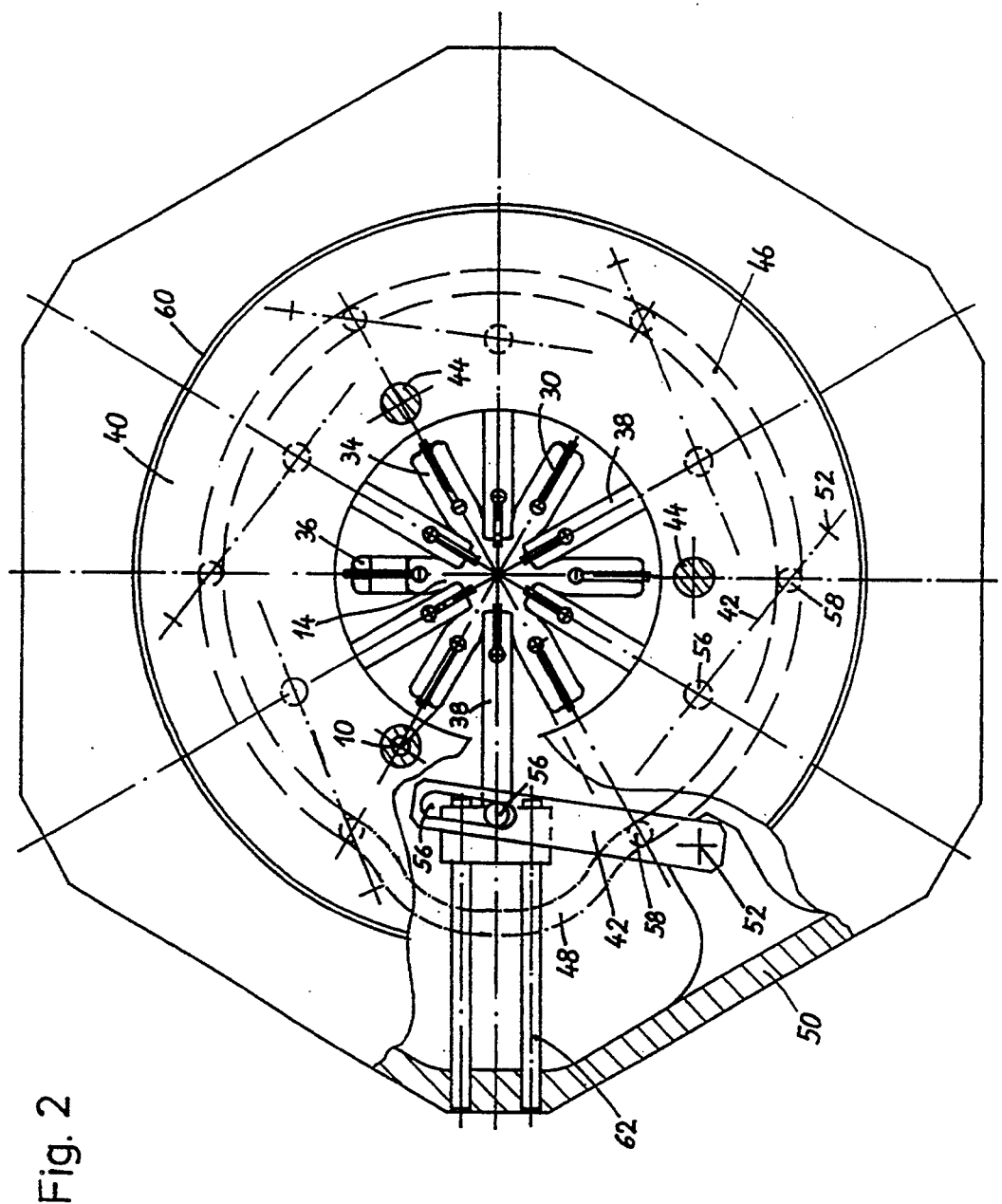
FIG. 2 shows a horizontal cross-section through the bottom part of the device of FIG. 1.

The winding device shown in FIG. 1 and 2 has a winding nozzle 10 driven in a standard revolving manner. The body 12 that carries it and whose revolving drive is not illustrated is usually called a flyer. The winding nozzle 10 revolves around a template 14 that is attached to a template carrier 16 in a replaceable manner, said template carrier 16 being itself positioned axially and radially on a shaft 18 that revolves together with the flyer 12. The shaft 18 can be moved axially by way of a drive that is not shown. In order to prevent the template 14 from revolving together with the flyer 12 and the shaft 18, support gearing 20 that is only suggested in the drawing is provided in a known manner and acts on the template carrier 16 with a part that is positioned in a non-revolving manner and in this way keeps the template carrier 16 from rotating. Such support gearing is described for instance in EP 278 153 A1.

The winding wire 22 is fed centrally via shaft 18 and suitable guides in the flyer 12 to the winding nozzle 10. The latter produces wire windings 24 on the template 14 during its revolution. In order to strip off the wire windings 24 axially from the template 14 and to transfer them to a transfer tool 26a or 26b, strippers 28, 30 exist that are guided in a sliding manner on the template carrier 16 and are axially positioned on a hollow shaft 32 that also revolves together with the flyer 12 and the shaft 18 and, due to an axial drive, is able to slide axially, independent from the shaft 18. In addition, it is possible that during the winding process, during each revolution of the flyer 12, a wobble plate drive permits the strippers 28, 30 to perform a short oscillating axial movement through that winding plane located at the level of the winding nozzle 10. The basic construction of such winding devices with flyer, template carrier, support gearing, and strippers is known. Examples of this are for instance German Patent 23 09 837 and EP 67 225 B1.

The transfer tools also are basically known in their construction and function. Transfer tool 26a for instance suggests transfer tongs consisting of a circle of parallel rods that can be used to transfer the winding produced on the template 14 onto a pulling-in tool that is then used to pull the winding into a stator lamination bundle. Alternatively, it is possible to transfer the winding directly from the template 14 to a pulling-in tool suggested by reference number 26b, whereby said pulling-in tool is transported—after receiving the windings that must be pulled in in one step—to a pulling-in device onto which is set a stator lamination bundle, and the windings are then pulled in.

During the winding process the work may be performed in such a way that first all wire windings of a winding are wound onto the template 14, and that at the end all are stripped off the template 14 together in a single stripping step. During this procedure, the strippers remain above the winding plane defined by the level of the winding nozzle 10 during the winding process. In order to obtain a single-layer winding on the template 14, the template is lowered continuously by approximately the wire thickness during each revolution of the winding nozzle 10. After the predefined number of windings has been produced on the template 14, the latter is lowered further together with the flyer 12 until all wire windings 24 are located below the top edge of the transfer tool 26a or 26b that penetrates into the openings of the template. Then the strippers 28, 30 also are lowered below the top edge of the transfer tool. When the template 14 is then pulled back up while the strippers are held at their bottom level, the winding is stripped off the template. Lastly, the strippers return to their top position also.

Alternatively, it is possible to strip most of the wire windings produced on the template into the transfer tool 26a or 26b already during the winding process. In this case, the template 14 is axially fixed during the winding process and the strippers 28, 30 perform the above mentioned short, oscillating movement. After conclusion of the winding process, the template 14 only must perform a relatively short axial lift to bring the last wire windings that are still on the template below the top edge of the transfer tool 26a or 26b; whereupon these windings are stripped off the template by the strippers that also can be lowered below the top edge of the transfer tool, just like in the case where all windings are stripped off together. These processes also have in common that the flyer 12 preferably is moved axially together with the template 14.

Except for the special shape of the template 14 that is seen in FIG. 1 and the special, different shape of the strippers 28, 30, the previously described part of the new device corresponds in its construction and function to known winding devices for producing simple, essentially round, oval, or polygonal coils, as they are used for the stators of electric motors. The following text now describes in more detail those parts that are additionally required for the production of wave windings.

For this purpose, the essentially prismatic template 14 has a star-shaped cross-section with, in the case of the embodiment, six arms 34 distributed evenly over the periphery and extending radially. The template for instance can be constructed in one piece and can have longitudinal slots in the arms, whereby axially sliding strippers 30 can be moved in these longitudinal slots. The slots are open at the free end of the arms 34, and the strippers 30 project radially from the arms 34 in order to grasp the wire windings at the arm ends during the stripping process and strip them off the template 14. As seen from FIG. 3 and 4, three bores into which the rods of the transfer tongs 26a are able to penetrate are integrated from the bottom into each of the arms 34.

Alternatively, it is also possible to attach a template 14 consisting of several parts to the template carrier 16, whereby, as indicated in FIG. 2 only with reference number 36, the external part of each arm 34 can be radially adjusted relative to its radial internal part or the core of the template. Such a radially adjustable template makes it possible to adjust the template in a simple manner if stator lamination bundles with different bundle heights must be wound.

For working together with the star-shaped template 14 during the forming of a wave winding, the device has six external forming elements in the form of slides 38 that can be radially inserted from the outside along each of the medians between two arms 34. In the fully inserted position there is only a relatively narrow gap between the radially internal ends of the slides 38 and the correspondingly formed template 14, so that the winding wire can be guided accurately inside the gap but cannot be clamped.

The slides also are equipped at their radially internal end with axial slots that are open radially towards the inside. In the radially internal position, the strippers 28 can be inserted into these slots, whereby the former project from the slots radially towards the inside.

The slides 38 are controlled and driven by a cam wheel 40 via lever 42. The cam wheel 40 is taken along by push arms 44 on the flyer 12 during the former's revolution. The cam wheel 40 has an integrated guide curve 46 that forms a revolving path over about 300°. The guide path forms a bulge 48 over the remaining 60°.

Each of the slides 38 is associated with a lever 42 that is located outside the revolving path of the winding nozzle 10. The levers each are positioned rotatably along the periphery, laterally offset next to the slides 38 on the stationary frame 50 of the device. The pivot point of a shown lever 42 is designated with 52. At the other end of the lever 42, it is equipped with a long hole 54 into which engages a driving pin 56 that is attached to the slide 38. Between the pivot point 52 and long hole 54, a cam roller 58 is positioned on the lever 42, said cam roller 58 engaging with the guide curve 46 of a cam wheel 40 that is positioned on the frame 50 via a bearing 60 on the periphery. The slide 38 that is moved by the lever 42 slides on two guide rods 62.

The lever ratios, i.e. the relative position between the pivot point 52 and cam roller 58 as well as between the pivot point 52 and the driving pin 56, as well as the position of the lever 42 relative to the guide curve 46, are chosen so that each slide 38 can be driven back and forth between the already mentioned radially internal position according to FIG. 3 and a radially external position shown in FIG. 4, while the cam roller 58 passes through the bulge 48. In the radially external position, the internal end of the slides 38 is located radially outside the winding nozzle 10, so that the latter is able to pass the slide 38 that is located in the winding plane on its circular revolving path.

In peripheral direction, the position of the pivot point 52 and cam roller 58 in relation to the respective controlled slide 38, the winding nozzle 10, and the bulge 48 of the guide curve 46 is chosen so that the outward movement of a specific slide 38 only starts when the winding nozzle 10 approaching the slide 38 is located approximately at the arm 34 that precedes the latter (see FIG. 3). Then the bulge 48 of the guide curve 46, by way of lever 42, causes a very fast outward retraction movement of the slide 38 so that the latter has reached its radially external end position before the winding nozzle 10 has passed the approximately 30° between the adjoining arm 34 and the slide 38. On the further path of the winding nozzle 10, approximately 30° between the retracted slide 38 and the next adjoining arm 34, the slide 38 is again returned by the lever 42 into its radially internal position and is held there as long as the cam roller 58 moves along the circular part of guide curve 46. The retraction of the slide 38 radially towards the outside naturally can begin earlier. For this, only the bulge 48 must be extended.

It is understood that instead of the described drive of the slides 38 by way of guide curve 46 and lever 42 it is also possible to use different drives for retracting the slides 38 from the radially internal position into the radially external position to enable the winding nozzle 10 to pass.

The previously described sequence of the winding process causes the winding wire leaving the winding nozzle 10 to be pressed radially inward through the latter between the two arms 34 that adjoin the slide immediately after the winding nozzle 10 has passed a slide 38, whereby wire is pulled from the winding nozzle 10 not only because of the revolving movement of the winding nozzle 10, but also because of the radial inward movement of the slide 38. It is clear that here the wire between the arms 34 and the slides 38 is already formed into a wave shape during the placement of a wire winding onto the template 14. In this form, the wave winding, as described above, is stripped either winding by winding already during the winding process or after its conclusion in its entirety to the transfer tool 26a or 26b, and then can be easily wound in the opposite rotation direction, whereby in the time between the two winding processes the wire is held in an actually known manner by a clamping device but is not cut. The second winding can be transferred in the same manner to the transfer tool 26a or 26b after the latter has been rotated by one rotary switching step. The two windings then are connected to each other only by a short, uninterrupted wire connection and are able to form the two layers of a double-layer wave winding.

Depending on the design of the template 14 with its arms 34 and the slides 38, any types of wave windings for use in any desired application can be produced.

What is claimed is:

1. A process for producing a wave winding comprising the steps of:
    revolving a winding nozzle through which a wire is fed along a winding path;
    locating a template inside of the winding path, which template has a specific number of radially projecting arms corresponding to a specific number of waves desired on the wave winding; and
    pushing, by use of respective external forming elements, the winding wire inward between respective sequential adjacent arms of the template as the winding nozzle revolves about the template.

2. A process for producing a wave winding as claimed in claim 1 wherein said pushing step pushes the winding wire to a position immediately adjacent flanks of the adjacent arms.

3. A process for producing a wave winding as claimed in claim 1 wherein said pushing step includes the moving of the respective forming element radially inward when the revolving winding nozzle is located between the respective forming element and a following one of the two adjacent arms between which the winding wire is pushed.

4. A process for producing a wave winding as claimed in claim 1 and further including the step of stripping off each successive winding from the template by use of a transfer tool.

5. A process for producing a wave winding as claimed in claim 1 including
    an initial revolving of the winding nozzle about the template and pushing of the winding wire to produce a first part of a wave winding;
    stripping off the first part of the wave winding from the template by use of a transfer tool;
    a subsequent revolving of the winding nozzle in a reverse direction of revolution to produce a second part of the wave winding; and
    stripping off the second part of the wave winding from the template by use of the transfer tool offset over a periphery thereof such that axis-parallel section of the first and second parts are traversed in a same current direction and thus can be pulled into a same stator groove.

6. A device for producing a wave winding comprising:
- a stationary template which has a specific number of radially projecting arms corresponding to a specific number of waves desired on the wave winding;
- a winding nozzle through which a wire is fed;
- a revolving means for revolving said winding nozzle along a winding path about said template;
- a respective forming element located between adjacent ones of said arms of said template and external to said template, each said forming element including a wire engaging end adjacent the winding path; and
- a moving means for moving respective said wire engaging ends of said forming elements to engage the winding wire and to push the winding wire inward between respective sequential adjacent arms of the template during each revolution of the winding nozzle about the template.

7. A device for producing a wave winding as claimed in claim 6 wherein a cross section of the wire engaging end of each of said forming elements is substantially similar to a cross section of an area between adjacent said arms of said template; and wherein said moving means moves the respective said wire engaging end of said forming elements in the area between adjacent said arms to a position where a small gap is left between the respective said wire engaging end of said forming element and the adjacent said arms, which small gap is only slightly larger than a diameter of said winding wire.

8. A device for producing a wave winding as claimed in claim 6 wherein each said arm includes a means for adjusting a radial length thereof.

9. A device for producing a wave winding as claimed in claim 6 wherein said moving means reciprocally moves the respective forming element both radially outward beyond the winding path of the winding nozzle and then radially inward during the period when the revolving winding nozzle is radially located between the two adjacent said arms between which the winding wire is thus pushed.

10. A device for producing a wave winding as claimed in claim 6 wherein said moving means includes:
- a respective lever for each respective said forming element located outside of the winding path,
- a respective cam roller attached to each respective said lever, and
- a cam guide curve which revolves with said winding nozzle and which is engaged by said cam rollers, said cam guide curve being generally circular shaped but including at least one bulge or recess ranging over an angle approximately equal to an angle between adjacent said arms.

11. A device for producing a wave winding as claimed in claim 6 and further including:
- respective first axial through slots in said arms;
- respective second axial through slots in said forming elements;
- a respective first stripper for each said arm;
- a respective second stripper for each said forming element; and
- a mounting means for mounting each said first and second strippers to said template for reciprocal axial movement in the associated respective said first axial through slot or second axial through slot such that said strippers perform a short reciprocal axial movement during each revolution of said winding nozzle to remove a winding from said template.

* * * * *